Figure 7:
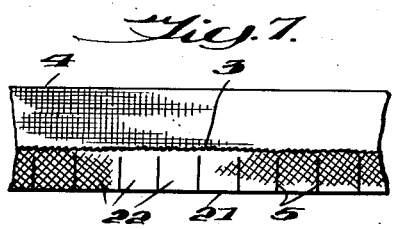

Oct. 16, 1956    R. W. BEEBY    2,766,504
MANUFACTURE OF FABRIC BINDINGS OR TRIMMINGS
Filed July 20, 1950    2 Sheets-Sheet 1
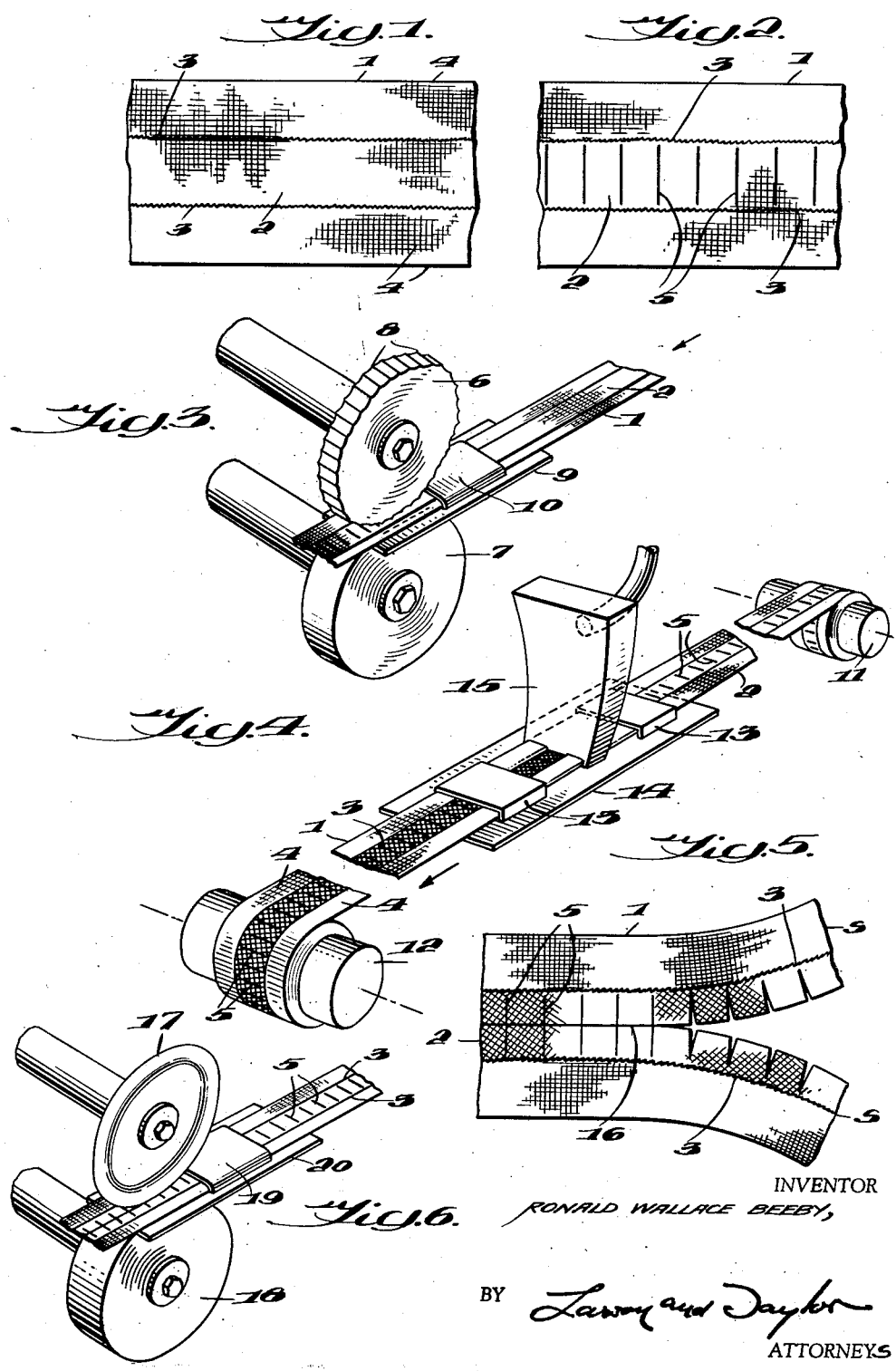
INVENTOR
RONALD WALLACE BEEBY,
BY *Lawry and Taylor*
ATTORNEYS Oct. 16, 1956 R. W. BEEBY 2,766,504
MANUFACTURE OF FABRIC BINDINGS OR TRIMMINGS
Filed July 20, 1950 2 Sheets-Sheet 2

INVENTOR
RONALD WALLACE BEEBY,
BY Larson and Taylor
ATTORNEYS

United States Patent Office 2,766,504
Patented Oct. 16, 1956

2,766,504

MANUFACTURE OF FABRIC BINDINGS OR TRIMMINGS

Ronald Wallace Beeby, Leicester, England

Application July 20, 1950, Serial No. 174,854

Claims priority, application Great Britain July 25, 1949

12 Claims. (Cl. 28—72)

This invention relates to bindings or trimmings such as those known either as French binding or binding "galloon," and is principally concerned with the manufacture of a binding strip suitable for binding vamps, ornamental straps and any other appropriate parts of boots and shoes—more especially ladies' fashion shoes. Bindings or trimmings manufactured in accordance with this invention are, however, suitable for a variety of other uses.

The invention is, moreover, primarily concerned, without, however, any limitation in this respect, with the manufacture of a woven binding strip of a previously proposed form having a selvedge along one edge only and the opposite non-selvedged edge portion of which is divided transversely at closely spaced intervals therealong and treated with a material adapted to control the separated teeth or tongues resulting from the transverse division and also to retain the warps and wefts in position so as to prevent fraying at that edge. The said material is usually applied to one face only of the strip, adjacent to the transversely divided non-selvedged edge, the strip being left untreated and flexible along and adjacent to the selvedged edge. In attaching a binding strip of this form, the strip is initially secured reverse side up or outermost on the material (work) to be bound with its selvedged edge registering with the edge of the work, by a row of stitching inserted closely adjacent to the edges so registered, whereupon the strip is rendered adhesive, e. g. by the application thereto of a suitable adhesive or cement, and is then turned backwardly over the edge of the work and finally pressed down upon the reverse side of the latter thereby leaving the face of the binding exposed on the work edge.

As will be understood, the aforementioned separated teeth or tongues facilitate the application of the binding—particularly when stitching it around sharp turns and curves such as those on the vamp of a shoe. In other words, the divisions producing the teeth or tongues enable the binding strip to be more smoothly stitched in position and to lie flat without strain or fullness when turned over the edge of the work.

The general aim of the invention is to provide a novel method of making a binding strip.

A particular object is the provision of an improved method of producing a binding strip of the form herein referred to.

The improved method of producing binding in strip form includes the steps of applying a stiffening agent, adhesive, cement or the like (hereinafter for the sake of convenience referred to as a "treating medium") to the central longitudinal portion of a web or ribbon of pliant material of a width, initially, twice that of the required strip, in which central portion are formed, or are to be formed, a co-extensive series of transverse slits or slots, and cutting the web or ribbon longitudinally along the median line thereof so as to divide it into two binding strips each having adjacent to one edge thereof a series of stiffened substantially non-curling teeth or tongues.

Although it is primarily the intention to use a woven web or ribbon consisting of textile warps and wefts, the web or ribbon from which the binding strip is made may be of a relatively thin plastic material, or a plastic material reinforced with textile threads, or even of leather or any other suitable pliant material.

The treating medium may be applied to the central longitudinal portion of the web or ribbon after it has been transversely slit or slotted and before division of the web or ribbon into two.

Alternatively, the treating medium may be applied before the central portion of the web or ribbon is transversely slit or slotted, in which instance such slitting or slotting and longitudinal division of the web or ribbon may be carried out simultaneously.

As will be readily appreciated, each of the two binding strips produced from one length of web or ribbon will, therefore, have one straight un-cut edge and, in the other edge, a longitudinal series of nicks or notches providing stiffened teeth or tongues. The marginal portion of each strip adjacent to the straight uncut edge is, of course, left untreated.

As will be appreciated from the foregoing, the principal reason for applying a treating medium to the central longitudinal portion of the web or ribbon is to prevent the teeth or tongues in the finished binding strips from curling, thereby facilitating the feeding of a strip through a sewing machine when being stitched onto the work. In the case of a woven textile web or ribbon, the treating medium also serves to prevent fraying of the non-selvedged edges when the web or ribbon is ultimately cut into two binding strips. Thus, the application of such a treating medium facilitates separation of the initially double-width web or ribbon into two separate binding strips.

In order that the invention may be more clearly understood and readily carried into practical effect, specific examples thereof will now be described with reference to the accompanying purely diagrammatic drawings, wherein, Figure 1 is a view of a portion of a typical woven web or ribbon (laid out in a flat condition) from which two identical binding strips can be readily produced in accordance with the invention, Figure 2 is a further similar view of the said web or ribbon as it appears after the central longitudinal portion thereof has been transversely slit, Figure 3 illustrates one form of mechanism which may be employed for transversely slitting the web or ribbon, Figure 4 illustrates the manner in which the transversely slit central longitudinal portion of the web or ribbon is coated with a stiffening medium or adhesive.

Figure 8:
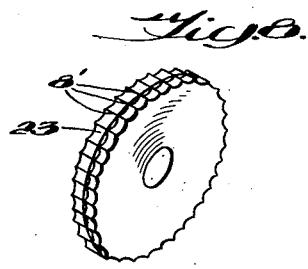
Figure 10:
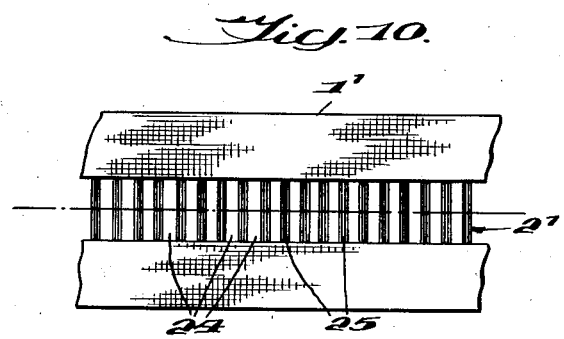
Figure 9:
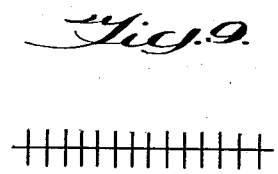
Figure 11:
Figure 12:
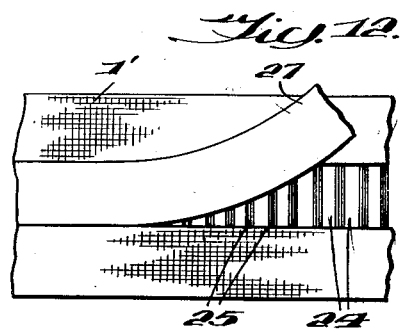
Figure 13:
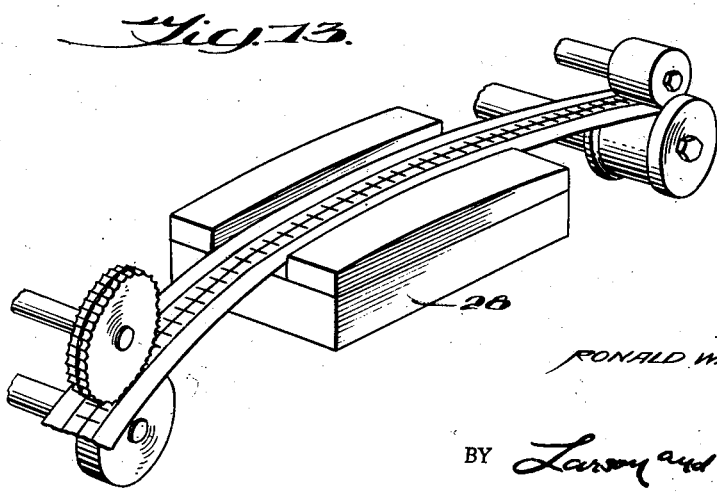

Figure 5 shows a transversely slit and suitably coated web or ribbon in the course of being divided longitudinally into two separate and identical binding strips, Figure 6 shows one form of mechanism for longitudinally dividing into two a prepared web or ribbon, Figure 7 shows a portion of a finished binding strip ready for use, Figure 8 illustrates a cutting wheel suitable for simultaneously slitting and longitudinally dividing a centrally coated web or ribbon, as will be hereinafter described, Figure 9 is a diagram showing the cuts produced by the cutting wheel depicted in Figure 8, Figure 10 shows a portion of a woven web or ribbon in the central longitudinal portion of which are provided transverse slots or openings formed, during the actual weaving operation, Figure 11 represents a portion of a binding strip made from the web or ribbon shown in Figure 10, Figure 12 illustrates one step in a modified way of carrying out the invention, and Figure 13 illustrates a modified form of mechanism for forming the web.

Like parts are designated by similar reference characters throughout the drawings.

The plain woven ribbon 1 illustrated in Figure 1 is of, say, approximately ¾" overall width, and has a central longitudinal portion 2 which is of about ¼" in width and defined at 3 by two parallel reinforcing cords or threads. The ribbon 1, which has two selvedges 4, may conveniently comprise a central series of cotton warps, a series of silk warps on either side of the said central cotton warps, and a continuous cotton weft thread. Ribbon of this particular construction is, of course, not novel per se.

To produce from such plain woven ribbon two identical binding strips, the central longitudinal portion 2 of the ribbon 1 is, according to one example, first slit so as to form therein, throughout its length, transverse slits 5 regularly spaced about 3⁄16" apart (see Figure 2). The slits 5 are straight and extend weftwise at right angles to the selvedges 4. To slit it in this way, a length of ribbon 1 may, as shown in Figure 3, be fed continuously between a suitably fluted wheel 6 and co-operating bed roller 7. The periphery of the wheel 6 has a circular series of uniformly spaced and suitably hardened straight cutting edges 8. The width of the wheel 6 and the spacing of the cutting edges 8 correspond respectively to the length and the spacing of the slits 5, to be formed in the ribbon. The wheel 6 and the bed roller 7 are so driven as to revolve in contact and in opposite directions. The fed ribbon is supported upon a thin plate 9 with which is associated a tubular guide 10. The plate 9 is, of course, appropriately slotted to permit of co-operation between the wheel 6 and the roller 7. Any other convenient means may, however, be employed for transversely slitting the ribbon.

The back of the transversely slit central longitudinal portion 2 of the ribbon 1 is then coated with any suitable stiffening medium or adhesive. One manner of applying such stiffening medium or adhesive is diagrammatically illustrated, by way of example, in Figure 4. As will be seen, the ribbon with its reverse side uppermost, is drawn off one roller 11 and reeled onto another roller 12 so as to feed it continuously through a pair of longitudinally spaced tubular guides 13 affixed to the top side of a flat supporting plate 14. At a location between the guides 13 is provided a nozzle 15 through which the stiffening medium or adhesive (indicated by cross hatching) is extruded under pressure upon the central portion 2 of the ribbon.

The transversely slit and coated ribbon is ultimately cut at 16, Figure 5, along its median line to divide it longitudinally into two separate and identical binding strips S. This dividing operation may advantageously be effected by feeding the slit and coated ribbon between a cutting disc, such as that indicated at 17 in Figure 6, and a co-operating bed roller 18. Here again, the ribbon is fed through a tubular guide 19 mounted on a plate 20 which is slotted, recessed or gapped to permit cooperation of the disc 17 with the roller 18. If desired, a fluted slitting wheel and a cutting disc may be used interchangeably with the same bed roller.

Each of the binding strips S thus produced is like that depicted in Figure 7 and has a selvedge 4 and an edge 21 which latter is in effect, nicked so as to produce a longitudinal series of separable rectangularly shaped teeth or tongues 22. Since the nicked edge of the strip is coated with a stiffening medium or adhesive, however, the teeth or tongues 22 will be stiffened and initially held together to prevent them from curling and fraying. The marginal portion of the strip S adjoining the selvedge 4 is untreated and in its original fully pliant condition.

According to a modification of the method just described, the back of the central longitudinal portion 2 of the ribbon 1 is coated with stiffening medium or adhesive before it is slit, whereupon the ribbon is passed between a bed roller and a cutting wheel of the character shown in Figure 8 so that it is simultaneously slit transversely and cut longitudinally into two. This modified method accordingly combines two separate operations and so reduces the overall expenditure of time and labour. On the other hand, in slitting the coated ribbon the teeth or tongues are separated so that it is desirable, at a location adjacent to the cutting wheel, to pass the coated ribbon over or beneath a heating device, e. g. roll or block, such as shown at 28 in Figure 13, to melt or soften the stiffening medium or adhesive and thereby cause the separate teeth or tongues to adhere together; this facilitates ultimate passage of the binding strip through a stitching machine when being stitched onto the work.

The cutting wheel shown in Figure 8 in addition to being peripherally fluted to provide spaced cutting edges $8^1$ is also formed with a central circular cutting edge 23 so that, in the result, the wheel produces the cuts shown in Figure 9.

According to another way of practicing the invention, the central longitudinal portion $2^1$ of a woven web or ribbon such as that indicated at $1^1$ in Figure 10 is formed, during the actual weaving operation by the omission of certain of the warps and wefts with regularly spaced transverse slots or openings 24. The central portion $2^1$ of the web or ribbon in its initial form is accordingly devoid of warps and is merely constituted by the central portions of spaced groups 25 of weft picks having slot-like openings 24 between them. In this example it is only the central portions of the spaced groups 25 of weft picks which are treated with a suitable stiffening medium or adhesive, these groups being thereby stiffened and set so as to produce longitudinally spaced teeth 26 (see Figure 11) when the web or ribbon is ultimately cut longitudinally into two binding strips such as $S^1$.

In a still further method of carrying out the invention, the starting material is a textile web or ribbon $1^1$ woven in the manner illustrated in Figure 10. The first step is to cover the back of the central portion $2^1$ of the web or ribbon with a narrow strip 27 of thin elastic material such, for instance, as rubber or a plastic material having the nature of rubber. Then, the applied strip 27 is coated with adhesive and finally the prepared web or ribbon $1^1$ is cut in two longitudinally to produce two identical binding strips each having an elasticised edge. In short, when such a strip is stitched in position, the applied strip of elastic material will permit of controlled movement of the spaced groups 25 of weft picks.

As to the stiffening medium or adhesive this is not necessarily confined to a thermoplastic material such as one compounded of rubber latex and wax, although, generally speaking, such a material will be preferred. It is possible also to use a sizing material such as glue, starch, cement or the like. In any event the medium may, if desired, be of such a nature as to render the finished binding strip self-adhesive, that is to say capable of being stuck into position without the application thereto of a special adhesive or cement. For example, the applied stiffening medium or adhesive may itself be adapted to be rendered tacky or sticky by the simple application of heat thereto.

What I claim then is:

1. A method of producing binding in strip form from a web of pliant material which initially is of a width twice that of the required strip, forming a series of transversely extending openings in the central portion of the web and cutting along the median line of the web so as to divide the web in two strips and treating the strips with a medium adapted to stiffen and control the series of teeth thereby produced on one edge of each binding strip.

2. A method of producing binding in strip form from a web of pliant material which initially is of a width twice that of the required strip which includes the steps of forming a series of transverse slits in the central portion of the web, applying a stiffening medium to the central longitudinal portion of the web and cutting the web longitudinally along the median line of said web so as to divide the web into two binding strips each having adjacent to the longitudinally cut edge thereof a series of stiffened, substantially non-curling teeth.

3. A method of producing binding in strip form from a web of pliant material which initially is of a width twice that of the required strip which comprises first forming in the central longitudinal portion of the web a co-extensive series of transverse slits, then coating the back of the said central longitudinal portion with a stiffening medium, and finally cutting the web longitudinally along the median line thereof to divide the web into two binding strips having a series of stiffened, substantially non-curling teeth adjacent the longitudinally cut edge.

4. A method of producing binding in strip form from a web of pliant material which initially is of a width twice that of the required strip which comprises first applying a stiffening medium to the back of the central longitudinal portion of the web and thereafter simultaneously forming in the said central portion a co-extensive series of transverse slits and cutting the web longitudinally along the median line of the web to divide the web into two binding strips having a series of stiffened, substantially non-curling teeth adjacent the longitudinally cut edge.

5. A method of producing binding in strip form according to claim 2, wherein the web is woven and has, initially, two parallel selvedged edges.

6. A method of producing binding in strip form according to claim 1, wherein the web is slit transversely during the manufacture thereof.

7. A method of producing binding in strip form according to claim 1, wherein the web is woven and has therein transverse slots produced during the actual weaving of the web by the omission of certain of the warps and wefts.

8. A method of producing binding in strip form according to claim 2, wherein the stiffening medium consists of a thermo-plastic material.

9. A method of producing binding in strip form according to claim 2, wherein the stiffening medium is extruded onto the web.

10. A method of producing binding in strip form from a web of pliant material which initially is of a width twice that of the required strip which comprises first applying a coating of thermoplastic material to the back of the central longitudinal portion of the web, forming in the said central portion a co-extensive series of transverse slits and simultaneously cutting the web longitudinally along the median line thereof to divide the web into two binding strips, and, during simultaneous slitting and longitudinal division of the web, heating the web so as to soften the thermoplastic coating and so cause the separated teeth produced on the separate binding strips to adhere together.

11. A method of producing a binding in strip form from a web of pliant material which initially is of a width twice that of the required strip which comprises omitting certain of the warps and wefts in the central longitudinal portion of the web to form transverse slots therein, covering with a strip of thin elastic material the back of the central longitudinal portion, then coating the said elastic strip with adhesive and finally cutting the web longitudinally along the median line thereof to divide it into two strips.

12. A method of producing a binding in strip form from a web of pliant material which initially is of a width twice that of the required strip comprising the steps of forming a series of transversely extending openings along the central longitudinal portion of the web, applying a stiffening medium to the central longitudinal portion of the web, and thereafter separating the web longitudinally along the median line thereof to divide the web into two binding strips each having a series of stiffened substantially non-curling teeth adjacent to one edge thereof.

References Cited in the file of this patent

UNITED STATES PATENTS

| | | |
|---|---|---|
| 673,293 | Schlegel | Apr. 30, 1901 |
| 1,323,212 | Bulley | Nov. 25, 1919 |
| 1,792,460 | Davis | Feb. 10, 1931 |
| 2,035,480 | Huizeng | Mar. 31, 1936 |
| 2,292,322 | Huizeng | Aug. 4, 1942 |
| 2,380,939 | Campbell | Aug. 7, 1945 |
| 2,601,617 | Klock | June 24, 1952 |

FOREIGN PATENTS

| | | |
|---|---|---|
| 14,837 | Great Britain | Aug. 2, 1894 |
| 669,424 | Great Britain | Apr. 2, 1952 |